United States Patent [19]
Jain et al.

[11] Patent Number: 5,485,014
[45] Date of Patent: Jan. 16, 1996

[54] MULTIPLE QUANTUM WELL BIREFRINGENT SPATIAL LIGHT MODULATOR

[75] Inventors: Faquir Jain, Storrs; Siu K. Cheung, Vernon, both of Conn.

[73] Assignee: The University of Connecticut, Storrs, Conn.

[21] Appl. No.: 175,610

[22] Filed: Dec. 30, 1993

[51] Int. Cl.⁶ .......................... H01L 31/12; H01L 31/16
[52] U.S. Cl. .................. 257/21; 257/84; 257/85; 257/98; 359/245; 359/246; 359/247; 359/248; 359/256
[58] Field of Search .................. 257/21, 85, 84, 257/98; 359/246, 247, 248, 256

[56] References Cited

U.S. PATENT DOCUMENTS

| | | | |
|---|---|---|---|
| 5,023,685 | 6/1991 | Bethea et al. | 257/21 |
| 5,105,301 | 4/1992 | Campi | 359/245 |
| 5,166,766 | 11/1992 | Grudnowski et al. | 257/21 X |
| 5,229,878 | 7/1993 | Tomita et al. | 257/21 X |
| 5,323,019 | 6/1994 | Dutta et al. | 257/85 X |

OTHER PUBLICATIONS

G. J. Sonek et al, "Dielectric Properties of GaAs/AlGaAs Multiple Quantum Well Waveguides IEEE Journal of Electronics", vol. QE–22, No. 7, Jul. 1986, pp. 1015–1018.

I. Suemune et al. "Mode Characteristics of Grating–Incorporated Channeled–Substrate–Planar GaAlAs Lasers" Appl. Phys. Let. 47(7) 1 Oct. 1985 p. 667.

H. J. Masterson et al. "Ferroelectric Liquid–Crystal Tunable Filter" Optics Letter, vol. 14, No. 22—Nov. 15, 1989 pp. 1249–1251.

J. S. Weiner et al. "Highly Anisotropic Optical Properties of Single Quantum Well Waveguides" Appl. Phys. Let. vol. 47, No. 7, 1 Oct., 1985 pp. 664–666.

"AC Liquid–Crystal Light Valve", T. D. Bearh W. P. Bleha, S–Y Wong Feb. 1973.

F. C. Jain, K. K. Bhattach Avjee—"Multiple Quantum Well Optical Modulator Structures Using Surface Acoustic Wave Induced Stark Effect IEEE Photonics Technology Letters", vol. 1, No. 10, Oct. 1989.

*Primary Examiner*—William Mintel
*Attorney, Agent, or Firm*—Pepe & Hazard

[57] ABSTRACT

A multiple quantum well birefringent spatial light modulator has a substrate, multiple quantum well layers thereon, contacts for applying a biasing electric field across the multiple quantum well layers; and a component for varying the biasing electric field to produce birefringence in the multiple quantum well layer enhanced by the Stark effect and thereby effecting modulation of light exiting therefrom. The electric field may be varied directly by varying the voltage applied across the contacts or by providing a photodetector in series with the multiple quantum well layers and using a writing beam impinging on a photodetector to vary the field.

19 Claims, 4 Drawing Sheets

MULTIPLE QUANTUM WELL BIREFRINGENT SPATIAL LIGHT MODULATOR

BACKGROUND OF THE INVENTION

The present invention relates to semiconductor spatial light modulators and, more particularly, to such modulators having multiple quantum well layers in which the modulation is effected by birefringence in the multiple quantum well layers.

Spatial light modulators (SLMs) are extensively used in the optical data/image processing technology which is vital for the realization of advanced image processing, telecommunications and computing systems. They utilize the inherent parallel processing capability of photonic systems and can be addressed electrically or optically to produce the desired signal outputs. Some of the signal processing functions performed by SLMs are optical matrix multiplication, incoherent image to coherent image conversion, electrical-to-optical conversion, thresholding of analog images, implementation of optical neural networks, and optical cross-bar switches.

SLM structures utilizing various physical effects have been reported in the literature and include liquid crystal devices and multiple quantum well modulators using quantum confined Stark effect (QCSE). Multiple quantum well (MQW) modulators and SLMs appear at present to be the fastest devices which can be addressed both electrically and optically. Recently, a new class of multiple quantum well optical modulators have been proposed in which the optical modulation is achieved by manipulation of the polarized light by field dependent birefringence in the MQW layers. The polarization-sensitive birefringent spatial light modulators (BSLMs) are in contrast with conventional multiple quantum well SLMs and with structures based upon self electrooptic device (SEED) which generally utilize quantum confined Stark effect (QCSE) to cause amplitude modulation by varying the electroabsorption.

It is an object of the present invention to provide a novel spatial light modulator based upon birefringence in a multiple quantum well structure.

It also an object to provide such a modulator which can be operated either electronically or optically.

Another object is to provide such a modulator which may be fabricated and operated relatively simply.

A further object is to provide a novel method for spatial light modulation using birefringence of polarized light in a multiple quantum well structure.

SUMMARY OF THE INVENTION

It has now been found that the foregoing and related objects may be readily attained in a multiple quantum well birefringent spatial light modulator, which includes a substrate, multiple quantum well layers, and contacts for applying a biasing electric field across the multiple quantum well layers. Also included is means for varying the biasing electric field to produce birefringence in the multiple quantum well layers enhanced by the Stark effect and thereby to effect modulation of light exiting therefrom.

In one embodiment, the multiple quantum well layers have cooperating pairs of angularly oriented reflecting elements spaced along the length thereof and the modulator includes cladding layers on the upper and lower surfaces of the multiple quantum well layers to confine the light entering thereinto. The reflecting elements reflect the modulated light outwardly of the modulator. In this embodiment, there is included an optical element on the upper surface of the modulator, and it directs or couples the multiple quantum well layers, light which is incident upon the optical element at an angle cooperating therewith. The reflecting elements are conveniently dielectric discontinuities in the multiple quantum well layers.

Generally, there are included light polarizing means comprising a polarizing layer through which light passes prior to entry into the multiple quantum well layers, and an analyzer on the surface of the modulator through which the modulated light exits.

In one embodiment, the source of biasing voltage includes means for varying the biasing voltage across the multiple quantum well layers to vary the birefringence in the multiple quantum well layers and thereby to effect the modulation. In another embodiment, there is included a photodetector structure between the multiple quantum well layers and the substrate and in series with the multiple quantum well layers, and a source of light incident on the substrate varies in intensity. As a result, the photodetector structure thereby varies the voltage drop and thereby the birefringence in the multiple quantum well layers.

When the modulator is to operate in a direct transmission manner, there is included a transducer to generate surface acoustic waves for inducing strain and causing birefringence in the multiple quantum well layers.

DETAILED DESCRIPTION OF THE ILLUSTRATED EMBODIMENTS

Figure 1:
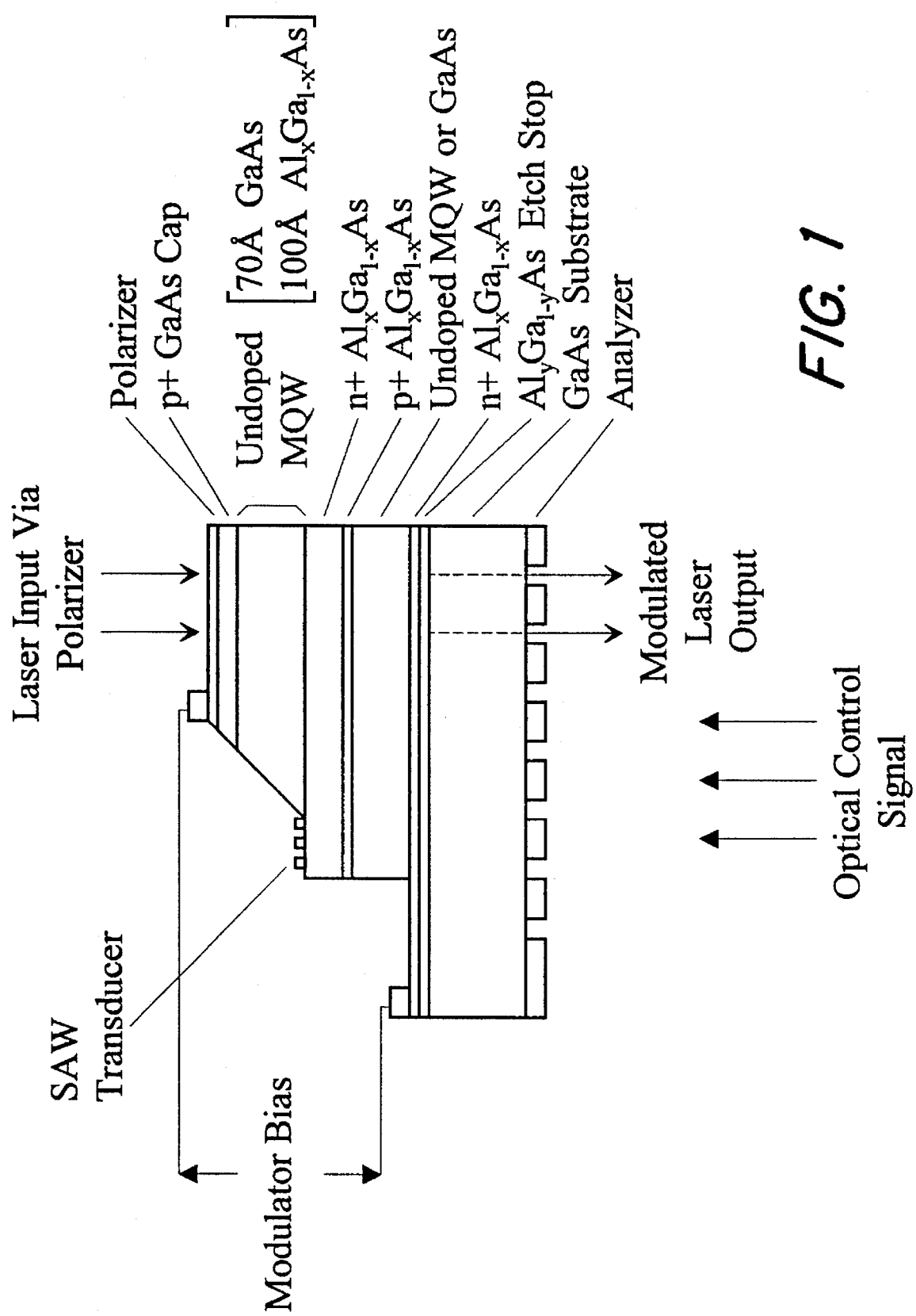
FIG. 1 is a schematic illustration of a multiple quantum well spatial light modulator embodying the present invention.

FIG. 1 is a schematic illustration of polarization sensitive optical modulator embodying the present invention and designed to operate in the transmission mode. In this embodiment, the light entering the modulator is perpendicular to its surface, and the structure is a p-i(MQW)-n modulator which is formed on a photosensing device. The laser input is absorbed via exciton formation in the undoped MQW region of the modulator. To induce strain in the multiple quantum layers, a surface acoustic wave (SAW) transducer is provided. Strain induced birefringence may be manipulated in several ways as is reported in the literature.

In one embodiment, the output of the device can be modulated either electrically by modulating the modulator bias or optically by controlling the intensity of the control beam which in turn governs the voltage drop across the p+-i-n detector. The biasing electrodes are designed so as not to interfere with the operation of the surface acoustic wave transducer. Only one bias supply is needed when the laser output is modulated by a control beam incident on the detector.

The voltage drop across the modulator part is higher if the intensity of the control beam is higher (less drop across the photodetector). A higher voltage drop gives rise to a greater value of electric field E in MQW layers which results in greater absorption α(hν) and lower output intensity. This operation is quite similar to a SEED device. The differences between the structure of FIG. 1 and a SEED modulator are: (1) the use of polarizer and an analyzer, and (2) the use of an i-region thickness d of a value which will produce a phase shift of 90° due to birefringence (Δn). In the case of an AlGaAs—GaAs birefringent modulator, a thickness of 5.08 μm is estimated for 90° phase shift (in the reflection mode) using Δn=0.042 and hν=1.453 Ev (or λ=853.4 nm). The well and barrier thickness in the MQW layers are 94Å and 200Å, respectively.

Table One shows Δn as a function of photon energy (hν) for various electric field values without intentional strain effect. The birefringence Δn is computed as a function of incident photon energy at various electric field values for an AlGaAs—GaAs system. Higher values of νn approaching 0.05 are expected for devices using coupled well and strained MQW layers. Conceptually, the proposed optical modulator is similar to the liquid crystal light valves which have been successfully used in wide ranging optical signal processing applications. However, liquid crystal light valves have inherent limitations due to the response time of the liquid crystals. In contrast, multiple quantum well light valves/modulators are significantly faster in response.

| Applied Field, E (Kv/cm) | Photon Energy (Ev) | Birefringence (Δn) |
|---|---|---|
| 16 | 1.453 | 0.018 |
| | 1.465 | 0.032 |
| | 1.485 | 0.005 |
| 100 | 1.445 | 0.012 |
| | 1.460 | 0.024 |
| | 1.485 | 0.002 |
| 180 | 1.435 | 0.0075 |
| | 1.453 | 0.005 |
| | 1.485 | 0.003 |

The observation of significant birefringence in MQW layers, as shown in Table One, was obtained in a waveguide using coupling in the TE and TM modes. In the case of oblique incidence, the birefringence is modified by:

$$\Delta n_{oblique} = (^nTE - ^nTM) \sin\theta_1 \sin\theta_2 \quad (1)$$

where $\theta_1$ and $\theta_2$ are the angles between the direction of wave normal and the two optical axes of the multiple quantum well layers. This results in a lower value of phase shift:

$$\delta = \frac{2\pi d}{\lambda} \Delta n_{oblique} \quad (2)$$

The phase shift value can be improved by requiring thicker multiple quantum well layers to increase the mean geometrical path of the transmitted beam. The mean geometric path d is represented by:

$$d = t/\cos\theta_2 \quad (3)$$

where t is the thickness of the multiple quantum well layers.

When the modulator is to function in a direct transmission mode as in FIG. 1, the entering light will be directed perpendicularly to the upper face of the modulator. As previously indicated, the necessary strain in the multiple quantum well layers is accomplished by use of surface acoustic waves which are generated by a transducer. As will be appreciated, the transducer will normally be mounted below the multiple quantum well layers. Moveover, it can be disposed so that it operates on either the X or the Y axis.

Figure 2:
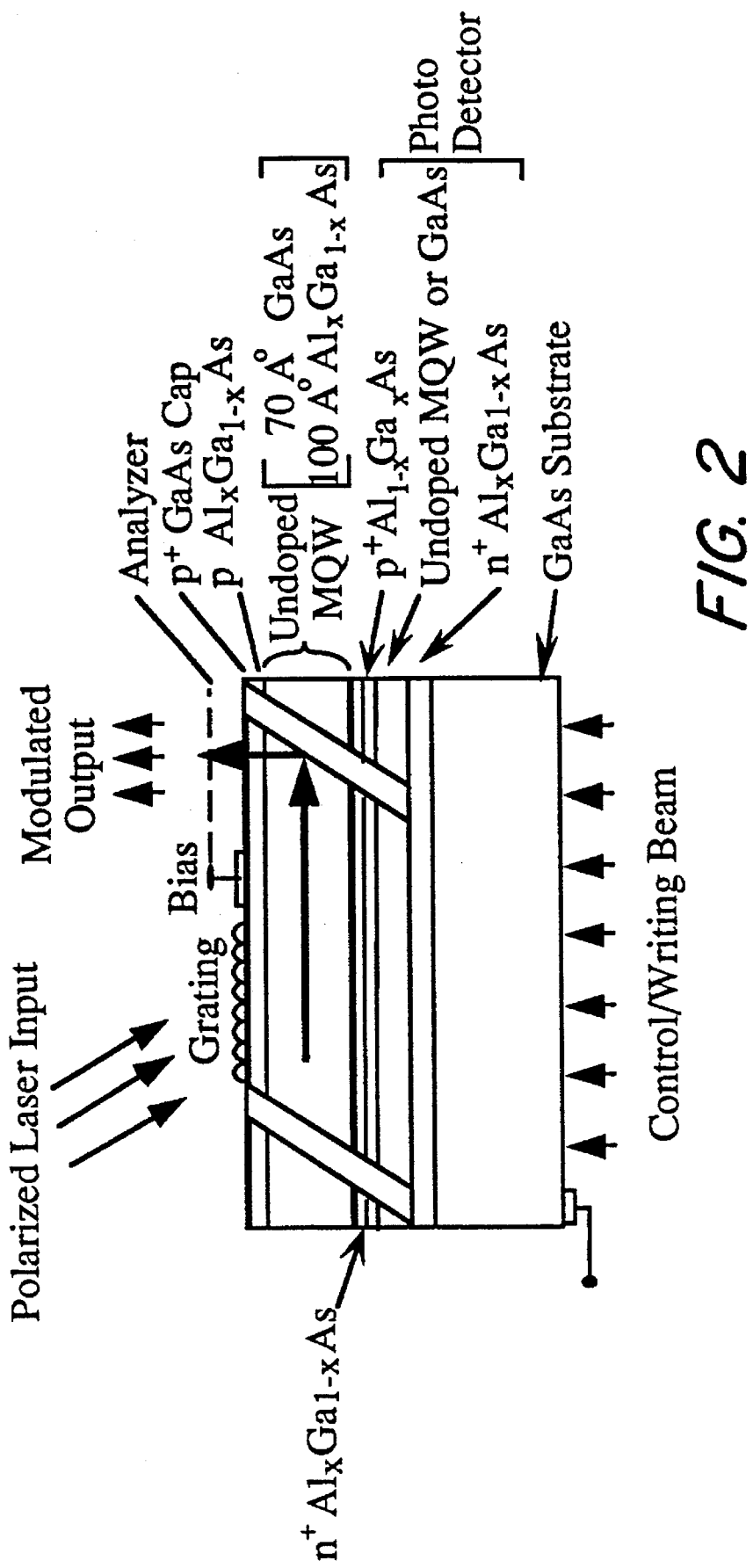
FIG. 2 is a schematic illustration of another multiple quantum well spatial light modulator embodying the present invention.

The structure of FIG. 2 shows a reflection mode modulator which includes an optical grating for coupling an angularly incident beam into the multiple quantum layer waveguide. A 45° mirror, similar to the one used in folded-cavity surface-emitting lasers, is employed to reflect the modulated beam towards the surface. This structure enhances the optical path length without requiring thick multiple quantum well layers to obtain the desired phase shift. The thickness of the MQW layers is designed to obtain appropriate propagating guided modes. The magnitude of the electric field in the multiple quantum well layers is determined by the control beam which is incident upon the built-in photodetector. The TE and TM modes propagate and undergo phase shift depending upon the pixel length and the magnitude of the field induced birefringence (Δn). The light is confined to the multiple quantum well layers by cladding on layers on their upper and lower surfaces until the light is totally reflected upwardly by the etched 45° mirror. The modulated and reflected signal emerges through an analyzer integrated on the surface. The intensity of the modulated output depends upon birefringence as well as electroabsorption effects.

The analysis of grating couplers in planar optical waveguides/modulators is well known in literature. When the projection of incident beam direction and the grating profile vector are not parallel, the incident polarized beam has a 25% mode conversion from the TM mode to the TE mode for an incident beam inclined at an angle θ g≈50° respective to the grating wave vector. An optimal coupling efficiency of approximately 60% for a sinusoidal grating profile may be expected. For TM mode operation, the input beam can have a nearly normal coupling angle with respect to planar surface of the device (e.g., $TM_0$, $TM_1$, and $TM_2$ have coupling angles of 7.3°, 4.9° and 0.7°, respectively). In the case of TE to TM mode conversion, the mode conversion can have a 50% split with the optimum coupling efficiency being≈20% when the input beam is inclined at about 31° with respect to the direction of the grating vector. The optimum coupling distances for TM and TE modes are 50 μm and 100 μm, respectively, assuming that the incident wavelength is 1 μm with the following parameters: 1) TM mode: $n_g$=4.0, Λ=0.41 μm, $t_g$=124Å and $n_s$= 3.28; 2) TE mode: $n_g$=1.73, Λ=0.1383 μm, $t_g$=69Å and $n_s$= 1.52. In addition, the grating profile can be designed to provide directional discrimination for the incident beam and thereby to achieve higher coupling efficiency. As seen from the data of Table One, the modulating length is about 10 μm when Δn=0.02. Hence, the size of the BSLM/pixel is about 60–100 μm with a grating period of about 0.4 μm and a grating thickness of about 124Å for TM mode operation.

Figure 3:
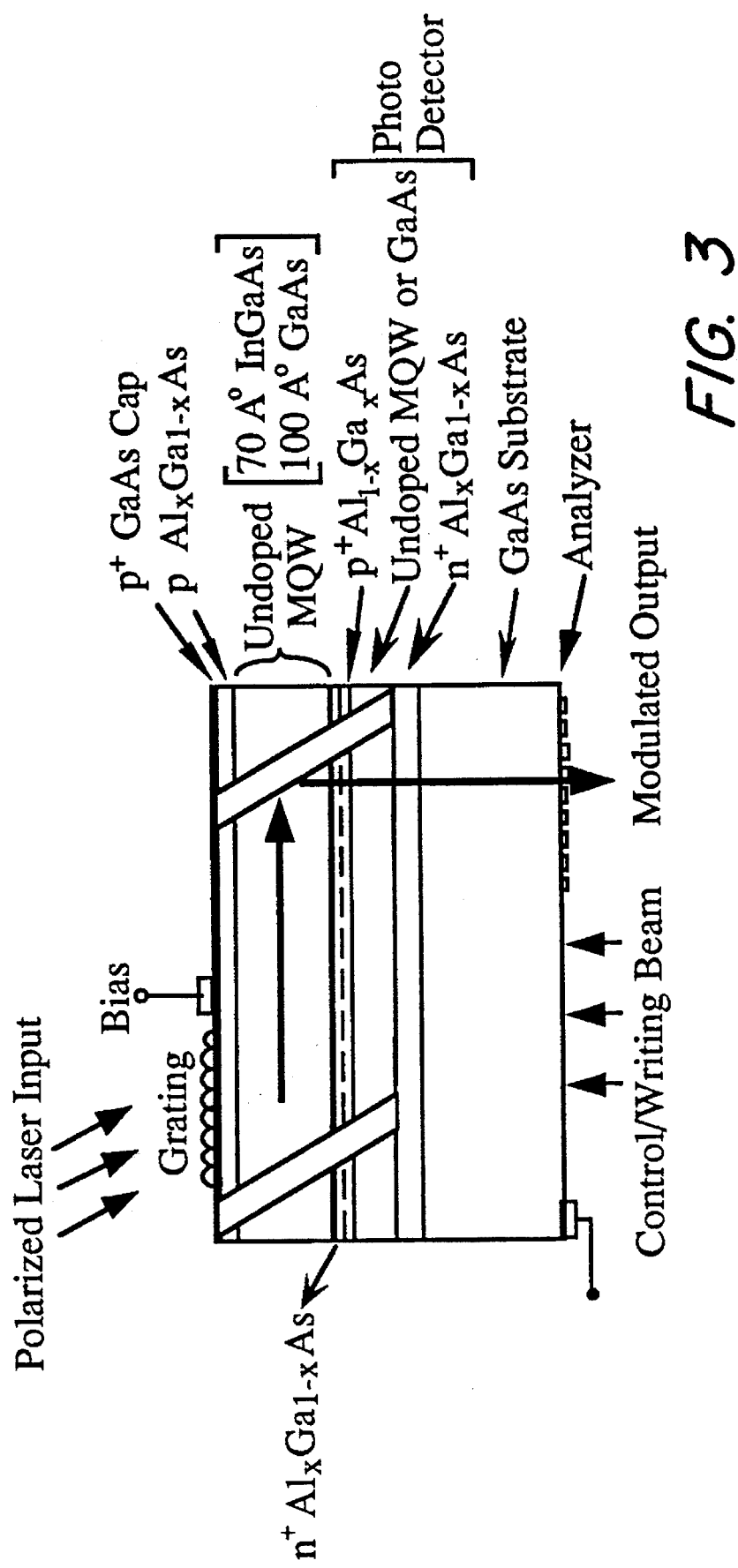
FIG. 3 is a schematic illustration of still another multiple quantum well spatial light modulator embodying the present invention.

FIG. 3 illustrates a BSLM similar to that of FIG. 2 but shows a BSLM for operation in the transmission mode. The basic operation of the modulator is similar to the device of FIG. 2, but the modulated beam exits from the substrate as the etched mirrors are oriented at an angle of 45° towards the substrate. Moreover, the multiple quantum well layers are of InGaAs—GaAs instead of AlGaAs—GaAs. The wavelength for operation corresponding to nonlinear excitonic effects depends on the indium composition (≈1000 nm for 20% indium). At this wavelength, AlGaAs, GaAs layers and the GaAs substrate are substantially transparent. The beam can be collimated using a planar microlens after it exits the substrate, and it then passes through an analyzer.

Figure 4:
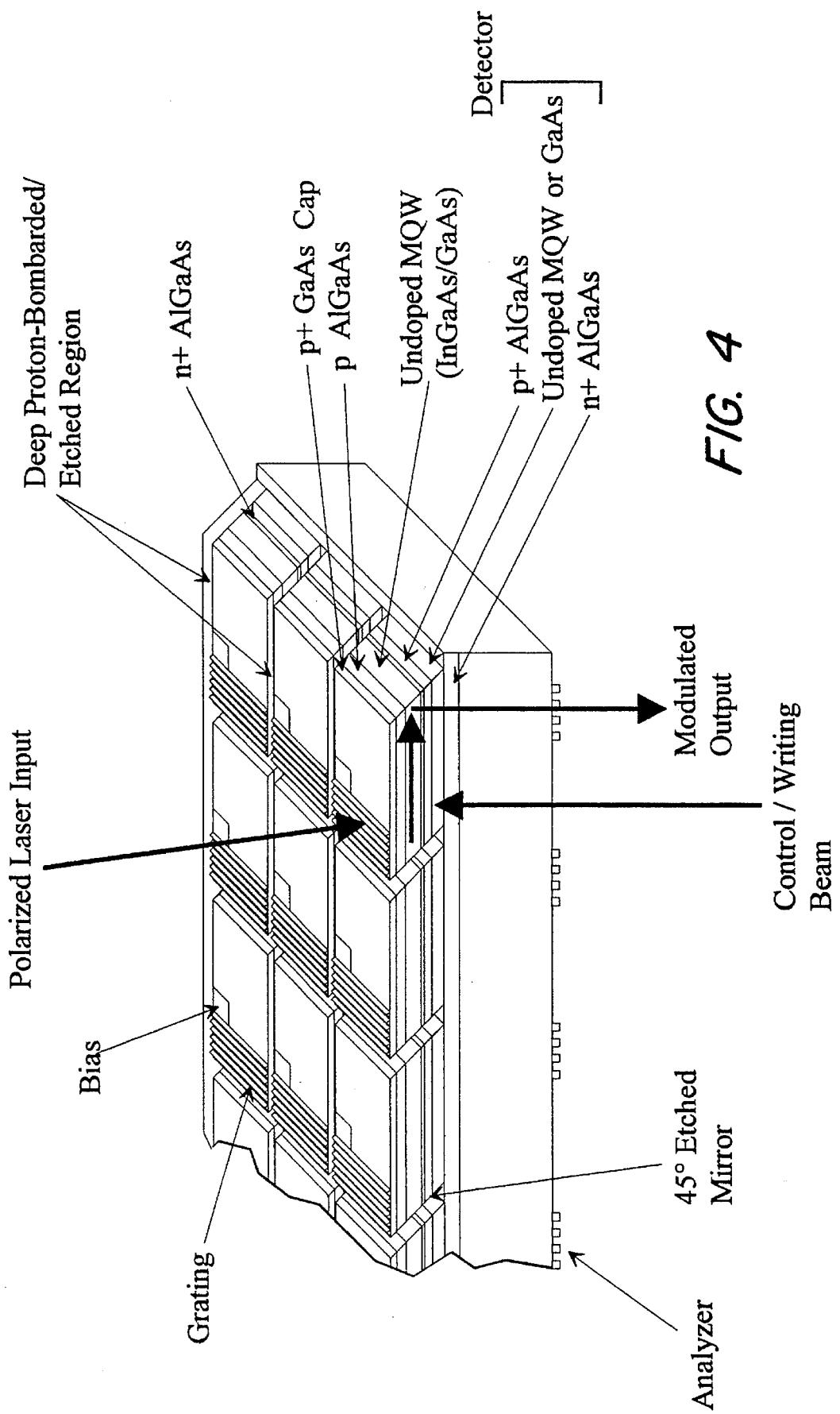
FIG. 4 is a schematic illustration of a spatial light modulator embodying the present invention and showing the bias electrode configuration.

A proposed two-dimensional BSLM based upon grating coupled devices is illustrated in FIG. 4. The rows of pixels are isolated by ion implanted regions. Alternatively, etching can also be used for separating the rows of pixels. This may not be essential if the multiple quantum well layers have sufficiently high resistivity. In a given row, the etching depth for the mirrors is shown to extend through the thickness of the InGaAsGaAs multiple quantum well layers (see also FIG. 2). Each channel is in the form of a coplanar waveguide which confines the coupled light laterally. The lateral dimension can be chosen to obtain fundamental $TE_0$ and $TM_0$ modes. A typical lateral width for such pixels may be 10–15 µm. The bias electrodes are disposed over the implanted or etched regions.

The grating coupled light modulator/pixel structure described provides an effective method for utilizing field-dependent birefringence in multiple quantum well layer waveguides. The use of the internally reflecting 45° mirrors not only directs the output beam but also results in isolation between the pixels in a row. The grating dimension needed for effective coupling and the optical path length desired for appropriate phase shifts due to birefringence yields a pixel size of about 10 µm×60 µm. The enhanced contrast obtained in a birefringent spatial light modulator BSLM due to the use of a polarizer/analyzer can also be utilized to increase the dynamic range of SEED devices.

Although most of the illustrated modulator assemblies have utilized gallium arsenide/aluminum gallium arsenide systems, other chemistries may be employed including, as the multiple quantum well, cladding and detector layers, indium gallium arsenide, indium gallium arsenide phosphide, zinc selenide, zinc cadmium selenide, and zinc sulfoselenide. These provide multiple quantum layers of various energy gaps hosting excitons in a wide range of photon energies.

As is well known, the wavelength of the entering light should be matched to the chemistry of the layers in the modulator. Generally, modulator structures of the present invention can be formulated to process light in the visible spectrum or the infrared spectrum by appropriate selection of the semiconductor materials.

The photodetector structure may vary from that shown in the illustrated embodiments as is also well known. Instead of an optical grating as illustrated, the optical element may be prismatic or any other type of device which will reorient and couple the incident light into the multiple quantum well layers.

As will also be appreciated, the pixel size can vary substantially from 1–100 µm along either X or Y axis. The thickness of the multiple quantum well layers will depend upon the desired degree of modulation.

Thus, it can be seen from the foregoing detailed description and attached drawings that the spatial light modulators of the present invention readily effect modulation of the light entering the quantum well layers by birefringence which is enhanced by the Stark effect. The modulated light may be reflected or pass through the modulator structure depending upon the materials employed, and modulation may be effected electrically or optically.

Having thus described the invention, what is claimed is:

1. A multiple quantum well birefringent spatial light modulator having top and bottom surfaces and comprising:
   (a) a substrate;
   (b) multiple quantum well layers thereon each having upper and lower surfaces, said multiple quantum well layers having cooperating pairs of spaced reflecting elements oriented at an angle of about 45° to said top surface and spaced along the length thereof to redirect the light impinging thereon outwardly of one of said surfaces of said modulator;
   (c) contacts for applying a biasing electric field across said multiple quantum well layers; and
   (d) means for varying the biasing electric field to produce birefringence in said multiple quantum well layers enhanced by the Stark effect and thereby to effect modulation of light exiting therefrom, said modulated light exiting said modulator at substantially a right angle to an exit surface.

2. The light modulator in accordance with claim 1 wherein said modulator includes cladding layers on the upper and lower surfaces of said multiple quantum well layers to confine the light entering thereinto.

3. The light modulator in accordance with claim 2 wherein there is included an optical grating on the upper surface of said modulator for coupling into said multiple quantum well layers, light incident upon said grating at an angle thereto, said optical grating being effective to couple the light into said multiple quantum well layer thereto.

4. The light modulator in accordance with claim 2 wherein said reflecting elements are dielectric discontinuities in said multiple quantum well layers.

5. The light modulator in accordance with claim 1 wherein there is included light polarizing means comprising a polarizing layer through which light passes prior to entry into said multiple quantum well layers.

6. The light modulator in accordance with claim 1 wherein there is included a source of biasing voltage and means for varying the biasing voltage across said multiple quantum well layers to vary the electric field and thereby the birefringence in said multiple quantum well layers.

7. The light modulator in accordance with claim 1 wherein there is included a photodetector structure between said multiple quantum well layers and said substrate and in series with said multiple quantum well layers, and wherein there is also included a controllable source of light incident on said substrate and photodetector structure and varying in intensity, said photodetector structure thereby varying the electric field and thereby the birefringence in said multiple quantum well layers.

8. The light modulator in accordance with claim 1 wherein there is included a transducer to generate surface acoustic waves for inducing strain and causing birefringence in said multiple quantum well layers.

9. The light modulator in accordance with claim 1 wherein there is included an analyzer on the surface of the modulator through which the modulated light exits.

10. A multiple quantum well birefringent spatial light modulator having top and bottom surfaces and comprising:
   (a) a substrate;
   (b) multiple quantum well layers on said substrate said layers each having upper and lower surfaces and cooperating pairs of spaced reflecting elements oriented at an angle of about 45° to said top surface and spaced along the length thereof to redirect the light impinging thereon reflecting modulated light outwardly of one of said surfaces of said modulator;
   (c) cladding layers on the upper and lower surfaces of said multiple quantum well layers to confine the light entering thereinto;
   (d) an optical grating on the upper surface of said modulator for coupling into said multiple quantum well layers, light incident upon said grating at an angle thereto, said optical grating being effective to couple the light into said multiple quantum well layer;

(e) a polarizing layer through which light passes prior to entry into said multiple quantum well layers;

(f) contacts for applying a biasing electric field across said multiple quantum well layers; and (g) means for varying the biasing electric field to produce birefringence in said multiple quantum well layers enhanced by the Stark effect and thereby to effect modulation of light exiting therefrom.

11. The light modulator in accordance with claim 10 wherein there is included a source of biasing voltage and means for varying the biasing voltage across said multiple quantum well layers to vary the electric field and thereby the birefringence in said multiple quantum well layers.

12. The light modulator in accordance with claim 10 wherein there is included a photodetector structure between said multiple quantum well layers and said substrate, in series with said multiple quantum well layers, and wherein there is also included a source of light incident on said substrate and photodetector structure and varying in intensity, said photodetector structure thereby varying the electric field and thereby the birefringence in said multiple quantum well layers.

13. The light modulator in accordance with claim 10 wherein said reflecting elements are dielectric discontinuities in said multiple quantum well layers.

14. In a method for effecting modulation of a polarized light beam, the steps comprising:

(a) providing a spatial light modulator with top and bottom surfaces and comprising:

(i) a substrate;

(ii) multiple quantum well layers on said substrate with top and bottom surfaces and cooperating pairs of spaced reflecting elements oriented at an angle of about 45° to said top surface of said modulator and spaced along the length thereof to redirect the light rays impinging thereon outwardly of one of said surfaces of said modulators; and (iii) contacts for applying a biasing electric field across said multiple quantum layers;

(b) introducing polarized light into said quantum well layers while applying a biasing electric field across said quantum well layers; and (c) producing birefringence in said multiple quantum well layer enhanced by the Stark effect by varying said biasing electric field thereacross to modulate the light exiting said multiple quantum well layers, said reflecting elements reflecting modulated light outwardly of said modulator.

15. The light beam modulation method in accordance with claim 14 wherein said provided light modulator is one in which said multiple quantum well layers have cooperating pairs of angularly oriented reflecting elements spaced along the length thereof and said modulator includes cladding layers on the upper and lower surfaces of said multiple quantum well layers to confine the light entering thereinto, said reflecting elements reflecting modulated light outwardly of said modulator, and wherein there is included an optical element on the upper surface of said modulator for directing into said multiple quantum well layers, light incident upon said grating at an angle cooperating therewith.

16. The light beam modulating method in accordance with claim 14 wherein said reflecting elements are dielectric discontinuities in said multiple quantum well layers.

17. The light beam modulating method in accordance with claim 14 wherein there is included a photodetector structure between said multiple quantum well layers and said substrate and wherein there is included the steps of providing a light source and varying the intensity of the light incident on said substrate and thereby said detector structure to vary the electric field birefringence in said multiple quantum well layers to effect the modulation.

18. The light beam modulating method in accordance with claim 14 wherein light is incident upon and enters through the upper surface of said modulator at an angle of about 90° and wherein surface acoustic waves are generated to induce strain and cause birefringence in said multiple quantum well layers.

19. The light beam modulating method in accordance with claim 14 wherein the modulated light is analyzed.

* * * * *